United States Patent
Chiou et al.

(10) Patent No.: US 9,491,217 B2
(45) Date of Patent: Nov. 8, 2016

(54) VIDEO CONFERENCING DEVICE AND CONTROL METHOD THEREOF

(71) Applicant: AVer Information Inc., New Taipei (TW)

(72) Inventors: Tzau-Min Chiou, New Taipei (TW); Yung-Chun Lin, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 0 days.

(21) Appl. No.: 14/710,258

(22) Filed: May 12, 2015

(65) Prior Publication Data

US 2016/0173549 A1    Jun. 16, 2016

(30) Foreign Application Priority Data

Dec. 10, 2014    (TW) .............................. 103143068 A

(51) Int. Cl.
*H04N 7/14*    (2006.01)
*H04L 29/06*   (2006.01)
*H04N 7/15*    (2006.01)
*H04N 5/272*   (2006.01)

(52) U.S. Cl.
CPC ......... *H04L 65/601* (2013.01); *H04L 65/1003* (2013.01); *H04N 5/272* (2013.01); *H04N 7/147* (2013.01); *H04N 7/155* (2013.01)

(58) Field of Classification Search
None
See application file for complete search history.

(56) References Cited

U.S. PATENT DOCUMENTS

| | | | | |
|---|---|---|---|---|
| 6,621,524 B1 * | 9/2003 | Iijima | ................... | H04N 5/262 348/584 |
| 8,659,638 B2 * | 2/2014 | Chao | .................... | H04L 65/403 348/14.01 |
| 2007/0076980 A1 * | 4/2007 | Maeda | ................. | H04N 1/3871 382/284 |
| 2009/0316163 A1 * | 12/2009 | Hanawa | ............. | H04N 1/00366 358/1.6 |
| 2013/0314421 A1 * | 11/2013 | Kim | ........................ | G09B 5/065 345/427 |
| 2015/0091940 A1 * | 4/2015 | Emori | .................... | G09G 5/377 345/629 |

* cited by examiner

*Primary Examiner* — Maria El-Zoobi
(74) *Attorney, Agent, or Firm* — Muncy, Geissler, Olds & Lowe, P.C.

(57) ABSTRACT

A VC (video conferencing) device for a VC system comprises a first and a second electronic device including an input module. The VC device comprises a communication module and a processing module. The communication module is electrically connected to the processing module. The communication module is communicating with the first and the second electronic device. The communication module broadcasts a background image to the second electronic device when receiving it from the first electronic device and receiving the writing image from the first and the second electronic device. When receiving the writing image, the processing module superimposes the writing image with the background image to produce a synthesized image. The communication module broadcasts the synthesized image, so that the synthesized image is displayed on the first and second electronic device simultaneously.

10 Claims, 12 Drawing Sheets

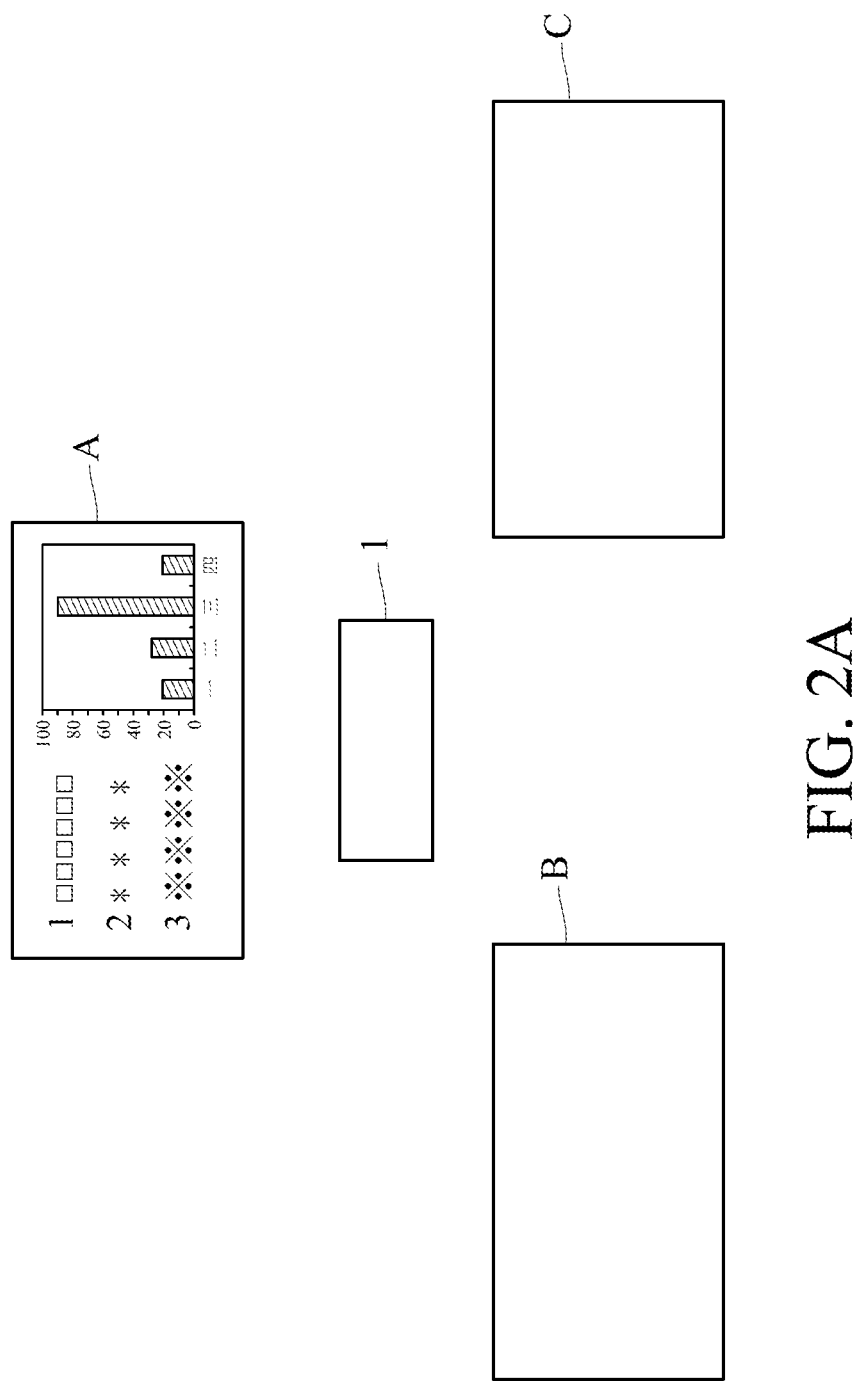

VIDEO CONFERENCING DEVICE AND CONTROL METHOD THEREOF

CROSS-REFERENCE TO RELATED APPLICATIONS

This non-provisional application claims priority under 35 U.S.C. §119(a) on Patent Application No. 103143068 filed in Taiwan, R.O.C. on Dec. 10, 2014, the entire contents of which are hereby incorporated by reference.

BACKGROUND

1. Technical Field

The present disclosure relates to a video conferencing device and a control method thereof, particularly to a video conferencing device and a control method thereof which superimposes a trace image with a background image.

2. Description of the Related Art

As the advancement of the modern technology, users are able to overcome the distance obstacles by the assistance of the electronic devices to interact with other people or handle things in different places. For example, the video conferencing (VC) system provides a convenient business solution for the participants all around the world which solves problems such as cross-regional conference, transnational conference, and online customer service. The participants can join a meeting without traveling a long way and the carbon footprint is reduced indirectly.

Although the VC system has provided many functions and solved lots of problems in the past, but there are still rooms for improvement. For example, during a presentation, participants often have discussions related to the contents of the presentation, and when participants are in the same room, they can mark or circle the key points with a laser pointer. However, when participants are in different places and have a meeting through the VC system, they can not directly mark the key points for other participants to understand.

SUMMARY

A video conferencing (VC) device is for a VC system comprising a first electronic device and a second electronic device, wherein the first electronic device and the second electronic device both has an input module. The VC device includes a communication module and a processing module. The communication module is for communicating with the first electronic device and the second electronic device, and when receiving a background image outputted from the first electronic device, for broadcasting the background image to the second electronic device, and for receiving at least one writing image outputted from either the first electronic device or the second electronic device, wherein the at least one writing image is the image of inputted writing traces by meeting participants through the input module of the corresponding electronic device. The processing module is electrically connected to the communication module, when the communication module receives the at least one writing image, and is for superimposing the at least one writing image with the background image to generate a synthesized image. When the processing module generates the synthesized image, the communication module broadcasts the synthesized image to the first electronic device and the second electronic device, so that the synthesized image is displayed on the first electronic device and the second electronic device simultaneously.

In an embodiment, the input module is selected from the group consisting of a touch panel, a graphics tablets, a mouse, and a keyboard.

In an embodiment, the communication module broadcasts the background image and the synthesized image through a protocol selected from the group consisting of H.239, H.323, session initiation protocol, and Binary Floor Control Protocol (BFCP) protocol.

In an embodiment, the VC device further includes a storage module electrically connected to the communication module and the processing module, and the storage module is for storing the background image and all of the writing images received by the communication module and for the processing module to sequentially superimpose the background image with the writing image according to the time of the writing image received by the communication module to generate the corresponding synthesized image.

In an embodiment, the device further includes a video graphic array (VGA) interface for communicating with the first electronic device and receiving the background image and the writing image.

A video conferencing (VC) device control method is for a VC system comprising a VC device, a first electronic device, and a second electronic device. The VC device control method includes communicating with the first electronic device and the second electronic device, when receiving a background image outputted from the first electronic device, broadcasting the background image to the second electronic device, when receiving at least one writing image outputted from either the first electronic device or the second electronic device, superimposing the at least one writing image with the background image to generate a synthesized image, wherein the at least one writing image is the image of inputted writing traces by meeting participants through the input module of the corresponding electronic device, and broadcasting the synthesized image to the first electronic device and the second electronic device, so that the synthesized image is displayed on the first electronic device and the second electronic device simultaneously.

In an embodiment, the at least one writing image is generated by an input module selected from the group consisting of a touch panel, a graphics tablets, a mouse, and a keyboard.

In an embodiment, the background image and the synthesized image are broadcasted through a protocol selected from the group consisting of H.239, H.323, session initiation protocol, and BFCP protocol.

In an embodiment, the method further includes storing the background image when receiving the background image, storing the at least one writing image when receiving the at least one writing image, and sequentially superimposing the background image with the at least one writing image according to the time of the received at least one writing image to generate the corresponding synthesized image.

In an embodiment, the method further includes using a VGA interface to communicate with the first electronic device for receiving the background image and the writing image.

BRIEF DESCRIPTION OF THE DRAWINGS

The present disclosure will become more fully understood from the detailed description given hereinbelow and the accompanying drawings, which are given by way of illustration only and thus are not limitative of the present disclosure and wherein:

FIG. 2A is an initialization diagram of the VC device according to an embodiment of the present disclosure;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
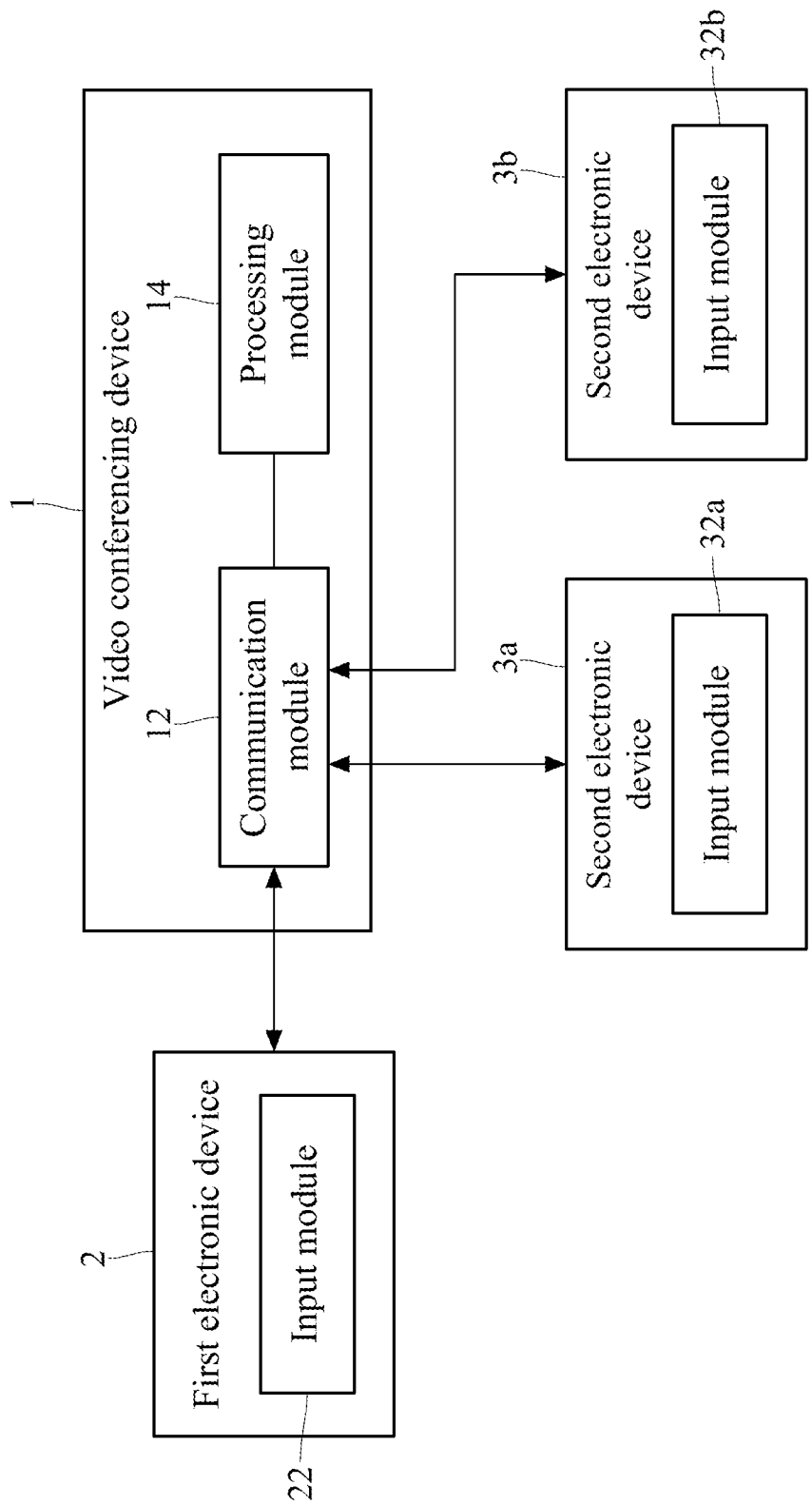
FIG. 1 is a block diagram of the VC device according to an embodiment of the present disclosure.

A video conferencing (VC) system in an embodiment of the present disclosure includes a first electronic device and a second electronic device. Please refer to FIG. 1. FIG. 1 is a block diagram of the VC device according to an embodiment of the present disclosure. As shown in FIG. 1, the VC device 1 includes a communication module 12 and a processing module 14, and the communication module 12 is electrically connected to the processing module 14. The communication module 12 is for communicating with a first electronic device 2 and second electronic devices 3a, 3b. The first electronic device 2 includes an input module 22. The second electronic devices 3a and the second electronic device 3b include input module 32a and input module 32b, respectively. Each of the input modules 22, 32a, 32b is, for example but not limited to, a touch panel, a graphics tablet, a keyboard, or a mouse. In addition, the number of the first electronic device is not limited to 1 and there are a plurality of first electronic devices in another embodiment. The present embodiment is for illustrating but not for limiting the present disclosure.

Although there are only two second electronic devices 3a and 3b illustrated in FIG. 1, the number of the second electronic devices communicating with the VC device 1 is not limited to 2. In addition, the electronic device 2, 3a, 3b and the VC device 1 can be in the same room or be separated in any distance, depending on the communication method between the electronic devices 2, 3a, 3b and the VC device 1. In practical implementation, the first electronic device 2 and the second electronic device 3a, 3b communicates with the communication module 12 through wired or wireless communication. The aforementioned wired communication interface is but not limited to Video Graphic Array (VGA), Universal Serial Bus (USB), or High Definition Multimedia Interface (HDMI), and the aforementioned wireless communication is but not limited to Wireless Fidelity (WIFI), 3-rd generation (3G), or 4-th generation (4G) mobile communication technology.

In practice, the same application is installed on each of the electronic devices 2, 3a, 3b. When the application is running, the electronic devices 2, 3a, 3b build network connections to the VC device 1 through the H.239, H.323, session initiation protocol (SIP), or Binary Floor Control Protocol (BFCP) protocol to transfer data. In addition, in an embodiment, different applications are installed on each of the electronic devices, as long as the application is available for connecting to the VC device 1. The embodiment is for illustrating but not for limiting the present disclosure.

After the communication module 2 receives a background image outputted from the first electronic device 2, the communication module 2 broadcasts the background image to the second electronic devices 3a, 3b and receives at least one writing image from either the first electronic device 2 or the second electronic devices 3a, 3b, wherein the at least one writing image is the image of inputted writing traces by the meeting participants through one of the input modules 22, 32a, 32b corresponding to the electronic devices 2, 3a, 3b respectively. The processing module 14 is for superimposing the at least one writing image with the background image to generate a synthesized image when the communication module 12 receives the at least one writing image. When the processing module 14 generates the synthesized image, the communication module 12 broadcasts the synthesized image to the first electronic device 2 and the second electronic devices 3a, 3b, so that the synthesized image is displayed on the first electronic device 2 and the second electronic devices 3a, 3b simultaneously. In practice, the communication module 12 broadcasts the background image and the synthesized image to each of the electronic devices 2, 3a, 3b through protocols such as H.239, H.323, SIP, or BFCP protocol . . . etc.

Please refer to FIG. 1 and FIG. 2A~2H together. FIG. 1 is a block diagram of the VC device according to an embodiment of the present disclosure. FIG. 2A~2H are actuating diagrams of the VC device, the first electronic device, and the second electronic device according to an embodiment of the present disclosure. In an embodiment, the first electronic device 2 is the electronic device used by the speaker in the video conference, and the background image is the contents of the power point (PPT) slides of the speaker or the images of the presentation presented by the speaker with the first electronic device 2. The second electronic devices 3a, 3b are the electronic devices used by other participants in the same video conference and obtain the presentation content from the VC device 1. FIG. 2A~2H illustrate the displayed images A, B, and C for representing the contents in the displays of the first, second electronic devices 2, 3a, 3b watched by the participants. The displayed images A, B, and C correspond to the first, second electronic devices 2, 3a, 3b at different moments with different contents. The following embodiment explains the relationship between the first, second electronic devices 2, 3a, 3b and the corresponding contents of the displayed images A, B, C.

Figure 2B:
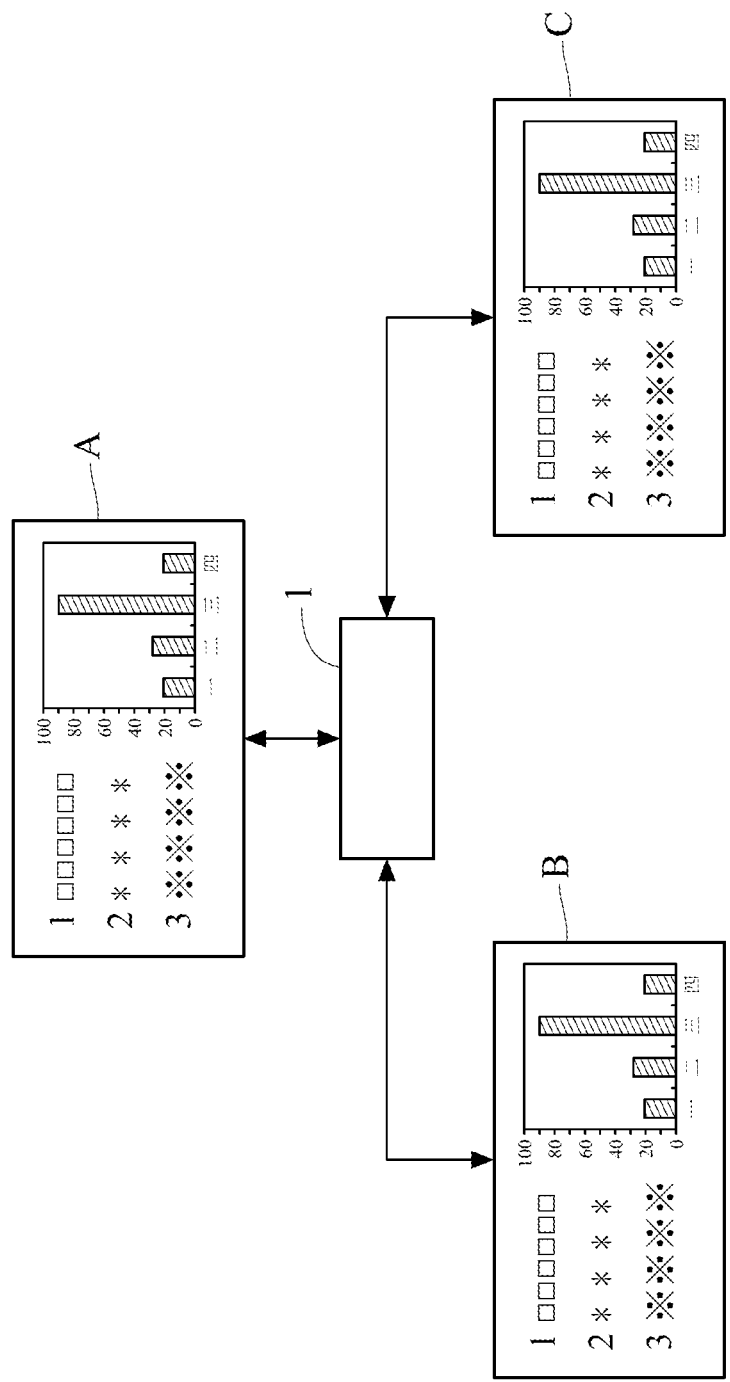
FIG. 2B is a diagram of the VC device broadcasting images according to an embodiment of the present disclosure.

In the previous embodiment, please refer to FIG. 2A. FIG. 2A is an initialization diagram of the VC device according to an embodiment of the present disclosure. The first electronic device 2 which the speaker uses displays the displayed image A. The content of the displayed image A is the presentation of the speaker at the moment corresponding to FIG. 2A, and at the same time, the second electronic devices 3a, 3b of other participants do not receive the image from the VC device 1 yet, so the displayed images B, C of the second electronic devices 3a, 3b do not display the contents of the presentation. In FIG. 2B, the first electronic device 2 and the second electronic devices 3a, 3b are electrically connected to the VC device 1 respectively, and the first electronic device 2 sends the displayed image A to the VC device 1. The VC device 1 sends the displayed image A to the second electronic devices 3a, 3b which forms the displayed image B, C respectively. Basically, the contents of the displayed image B, C are identical to the displayed image A. In practice, the displayed image B, C further includes the related operation interface. Persons skilled in the art can design according to the need and the present embodiment is for illustrating but not for limiting the scope of the present disclosure.

Figure 2C:
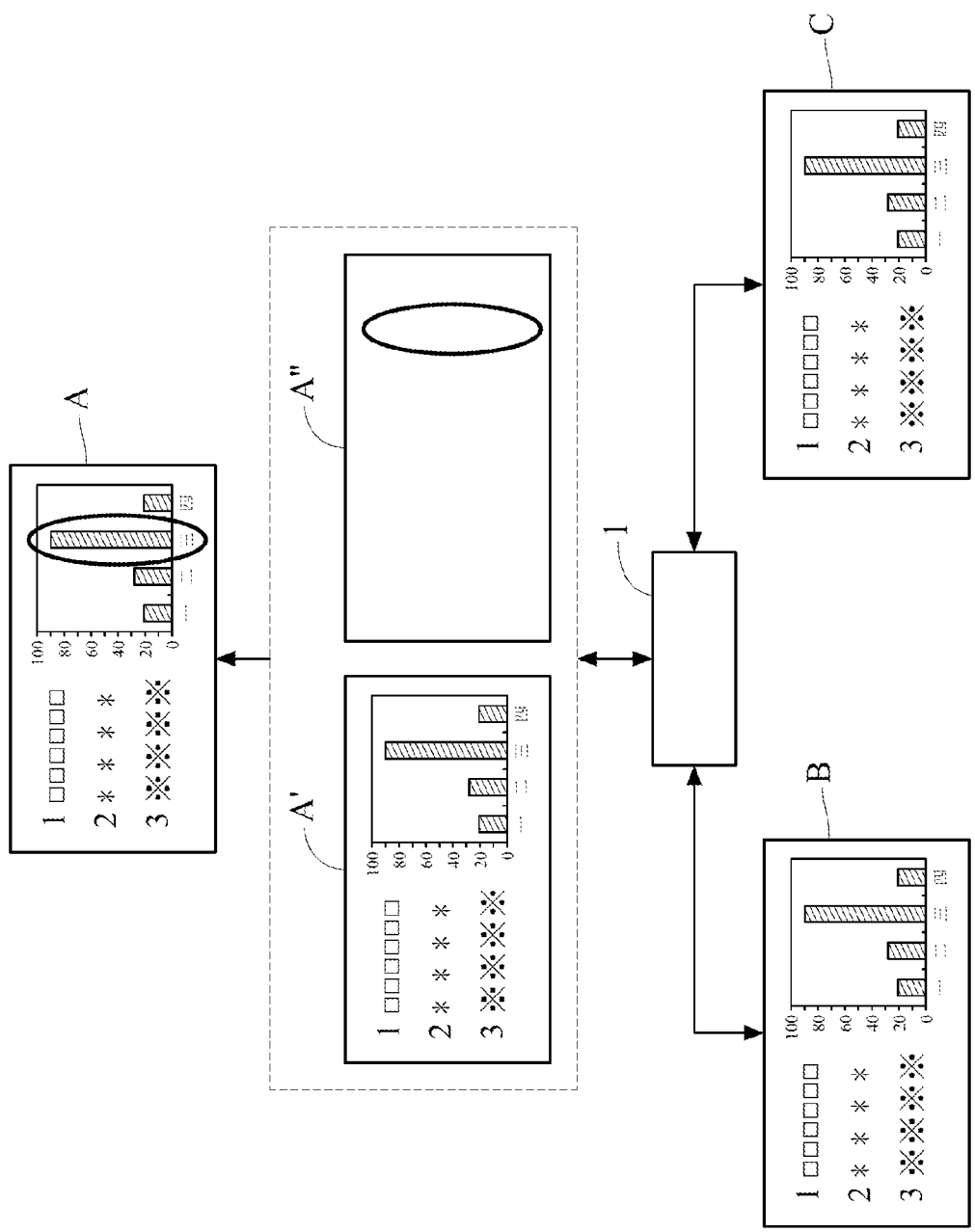
FIG. 2C is a diagram of the first electronic device generating the background image and the trace image to the VC device broadcasting images according to an embodiment of the present disclosure.

Next, please refer to FIG. 2C. FIG. 2C is a diagram of the first electronic device generating the background image and the trace image to the VC device broadcasting images according to an embodiment of the present disclosure. The speaker inputs the writing image A" through the first electronic device 2 and the speaker sees the displayed image A which combines the background image A' and the writing image A" through the first electronic device 2. The displayed image A is the aforementioned synthesized image. However, at the moment illustrated in FIG. 2C, the VC device 1 does not receive the image information related to the writing image A" yet, so other participants see the original displayed images B, C through the second electronic devices 3a, 3b. In other words, the displayed images B, C are identical to the background image A'.

Figure 2D:
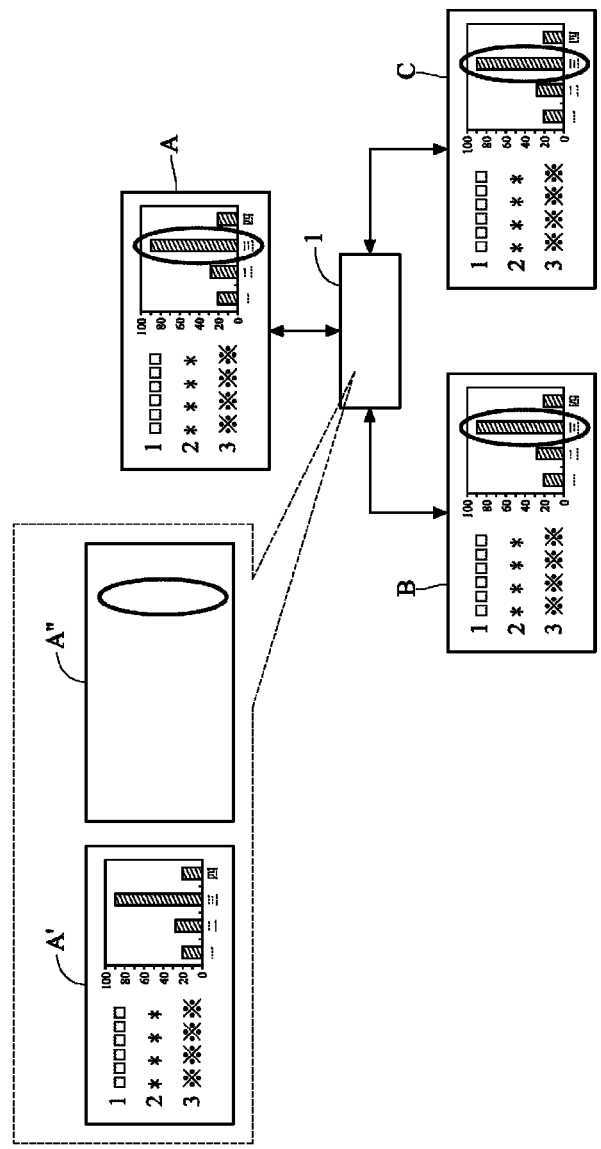
FIG. 2D is a diagram of the VC device superimposing the trace image of the first electronic device with the background image according to an embodiment of the present disclosure.

Next, please refer to FIG. 2D. FIG. 2D is a diagram of the VC device superimposing the trace image of the first electronic device with the background image according to an embodiment of the present disclosure. As shown in FIG. 2D, the first electronic device 2 sends the background image A' in FIG. 2C and the writing image A" in FIG. 2C to the VC device 1 and the VC device 1 superimposes the background image A' with the writing image A" to generate a first synthesized image, and the first synthesized image is sent to the second electronic devices 3a, 3b. Currently, the displayed images B, C of the second electronic device 3a, 3b are the first synthesized image. Specifically, the contents of the displayed images B, C are identical to the displayed image A. Therefore, the participants other than the speaker obtain the presentation contents through the second electronic devices 3a, 3b and see the marked trace on the presentation contents by the speaker instantly, and persons skilled in the art can easily understand the present embodiment. The time gap between FIG. 2C and FIG. 2D depends on the practical concerns of the system design and is for illustrating but not for limiting the present disclosure.

Figure 2E:
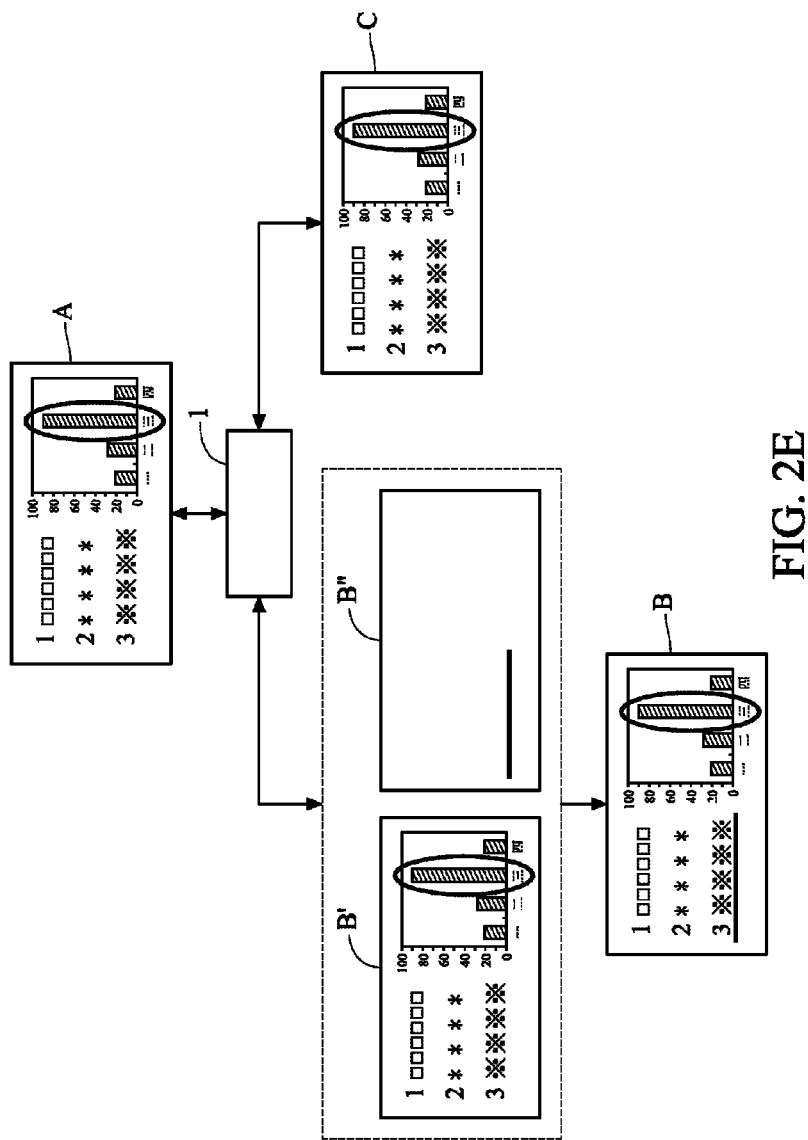
FIG. 2E is a diagram of the second electronic device generating the background image and the trace image to the VC device broadcasting images according to an embodiment of the present disclosure.

Next, please refer to FIG. 2E. FIG. 2E is a diagram of the second electronic device generating the background image and the trace image to the VC device broadcasting images according to an embodiment of the present disclosure. As shown in FIG. 2E, a certain participant inputs the writing image B" through the second electronic device 3a according to the background image B' to mark a key point on the presentation content to notice other participants. Similar to FIG. 2C, currently the participant see the synthesized image like the displayed image B through the second electronic device 3a and the VC device 1 does not receive the image information related to the writing image B" yet, so that the speaker and the participant corresponding to the first, second electronic device 2, 3b see the displayed images A, C shown in FIG. 2D. Specifically, the displayed images A, C are identical to the synthesized image formed by superimposing the background image A' with the writing image A".

Figure 2F:
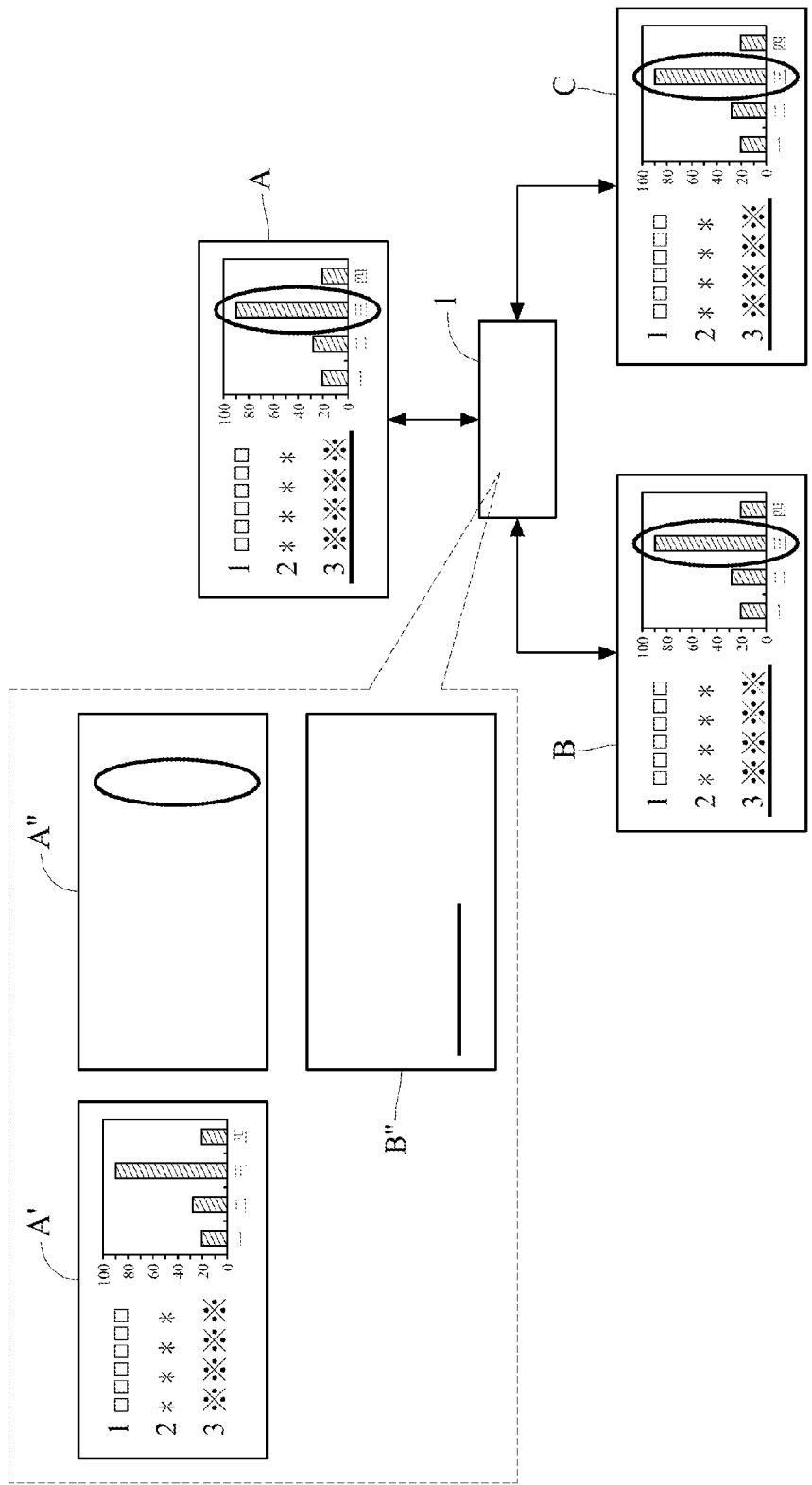
FIG. 2F is a diagram of the VC device superimposing the trace image of the second electronic device with the background image according to an embodiment of the present disclosure.

Please refer to FIG. 2F. FIG. 2F is a diagram of the VC device superimposing the trace image of the second electronic device with the background image according to an embodiment of the present disclosure. As shown in FIG. 2F, the second electronic device 3a sends the writing image B" to the VC device 1 and sends the second synthesized image to the first, second electronic devices 2, 3a, so that the displayed image A, C corresponding to the first, second electronic devices 2, 3a display the second synthesized image like the displayed image B and the participants including the speaker know the presentation contents and the combined marked trace of the speaker and the participants.

Figure 2G:
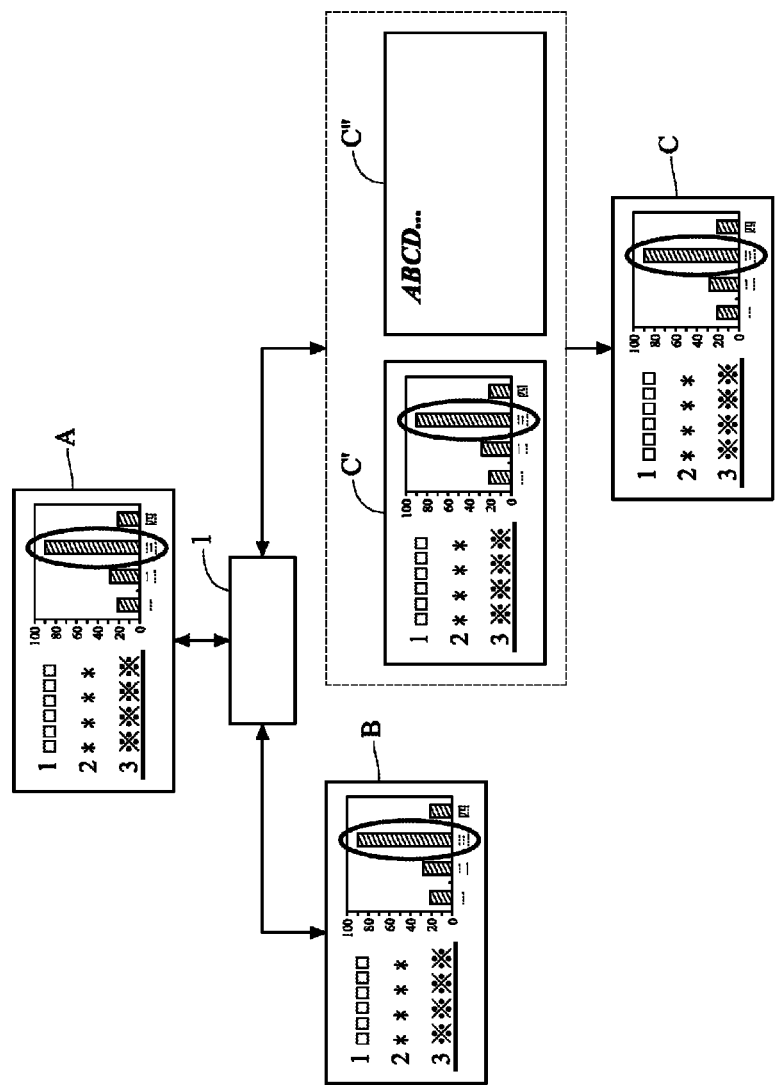
FIG. 2G is a diagram of another second electronic device generating the background image and the trace image to the VC device broadcasting images according to an embodiment of the present disclosure.

Following the same embodiment, please refer to FIG. 2G. FIG. 2G is a diagram of another second electronic device generating the background image and the trace image to the VC device broadcasting images according to an embodiment of the present disclosure. As shown in FIG. 2G, another participant inputs the writing image C" through the second electronic device 2b according to the background image C' to comment on the presentation contents and the other participant sees the complete synthesized image like the displayed image C through the second electronic device 3b. At the moment illustrated in FIG. 2H, the VC device 1 receives the writing image C", and superimposes the writing images A", B", C" with the background image A' to form the third synthesized image, and sends the third synthesized image to the first, second electronic devices 2, 3a. Currently, the speaker and other participants know the comments inputted by the aforementioned participant through the second electronic device 3b from the displayed images A, B corresponding to the first ` second electronic devices 2, 3a. Specifically, every participant including the speaker see the synthesized image generated by superimposing the writing image A", B", C" with the background image A'.

Figure 3:
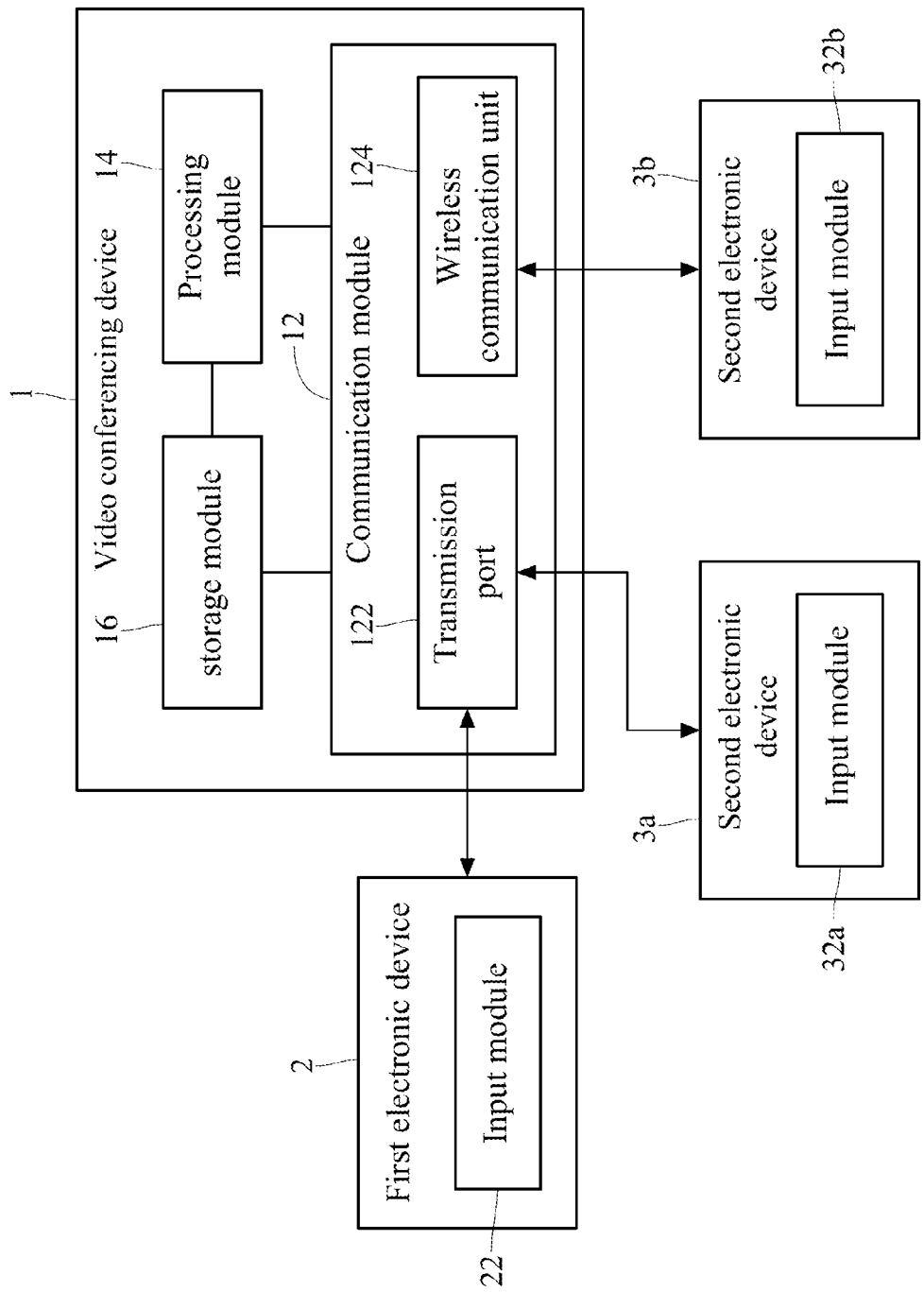
FIG. 3 is a block diagram of the details of the VC device according to another embodiment of the present disclosure.

Please refer to FIG. 3. FIG. 3 is a block diagram of the details of the VC device according to another embodiment of the present disclosure. As shown in FIG. 3, the communication module 12 of the VC device 1 further includes a transmission port 122 and a wireless communication unit 124, and the VC device 1 further includes a storage module 16. The first electronic device 2 and the second electronic device 3a are communicating with the transmission port 122 through the aforementioned wired connection, and the second electronic device 3b is communicating with the wireless communication unit 124 through the aforementioned wireless connection. In the embodiment of FIG. 3, the VC device 1 further includes the storage module 16. The storage module 16 is electrically connected to the communication module 12 and the processing module 14. The storage module 16 is for storing the images from the first electronic device 2 and the second electronic devices 3a, 3b. The VC device 1 works in different ways according to the types of the images stored in the storage module 16. Two examples are specifically described as follows.

Figure 2H:
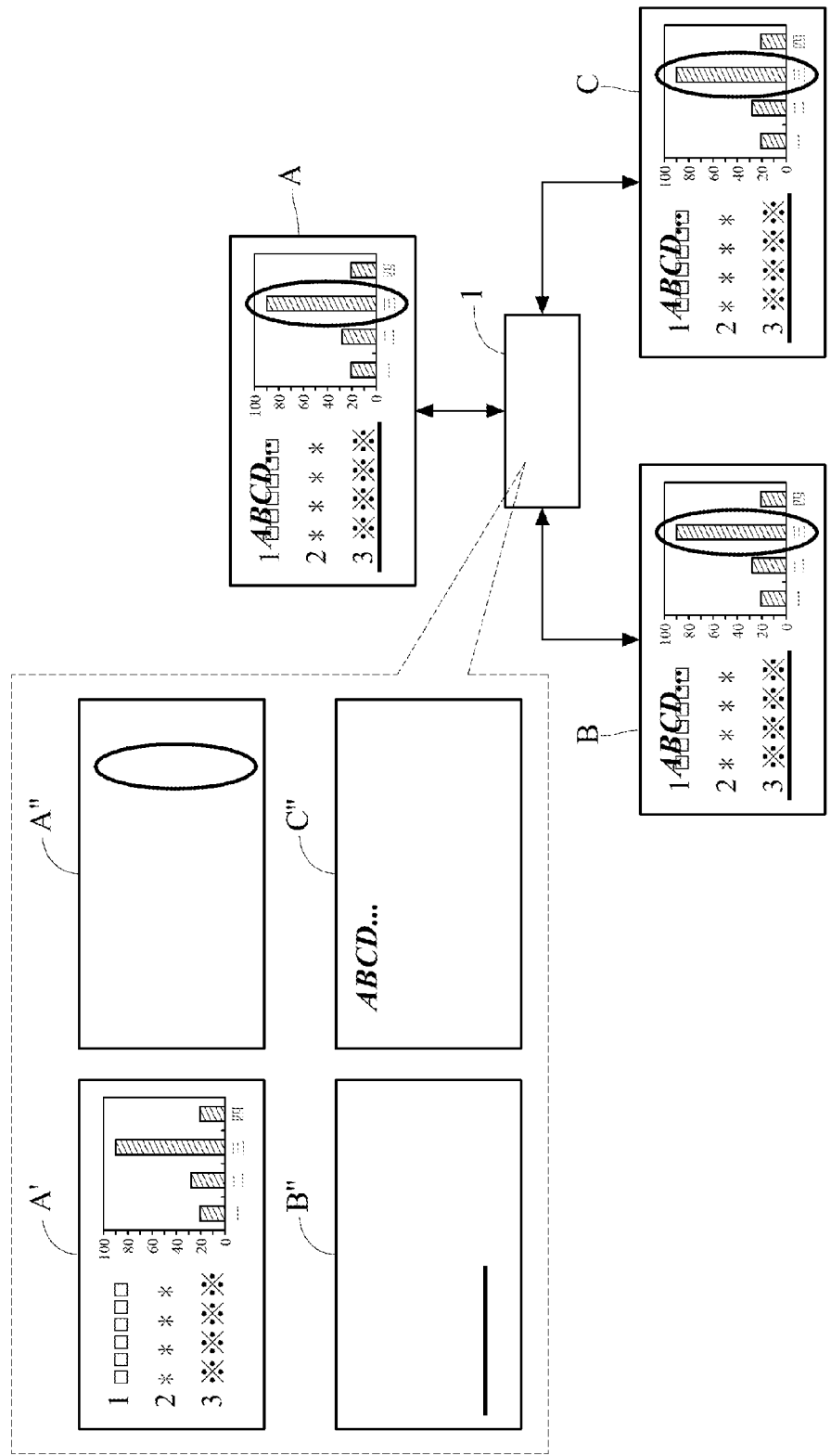
FIG. 2H is a diagram of the VC device superimposing the trace image of another second electronic device with the background image according to an embodiment of the present disclosure.

In an embodiment, the storage module 16 is for storing the background image A' and the entire writing image A", B", C" from the first electronic device 2 and the second electronic devices 3a, 3b. The processing module 14 obtains the entire received writing image A", B", C" from the storage module 16 and sequentially superimposes the writing image A", B", C" with the background image A' according to the source or time of the writing image A", B", C" to form the first, second, and third synthesized image. Please refer to FIG. 2A~2H and FIG. 3 together. In this embodiment, the communication module 12 sequentially receives the writing images A", B", C" illustrated in FIG. 2D, 2F, 2H at different time. The VC device 1 stores the writing images A", B", C" and the corresponding time and sources with storage module 16. The processing module 14 reads the writing images A", B", C" from the storage module 16 and sequentially superimposes the writing images A", B", C" with the background image A' according to the time or sources corresponding to the writing images A", B", C", so that the displayed images A, B, C illustrated in FIG. 2D, 2F, 2H are the synthesized images with the corresponding time.

Following the aforementioned explanation, more specifically, as the time illustrated in FIG. 2D, the communication module 12 receives the background image A' and the writing image A" and the processing device 14 superimposes the writing image A" with the background image A' to form the first synthesized image like the displayed image A illustrated in FIG. 2C, and the background image A' and the writing image A" and the corresponding time and sources are stored in the storage module 16. Next, the communication module 12 broadcasts the first synthesized image to the first electronic device 2 and the second electronic devices 3a, 3b. After a while, the communication module 12 receives the writing image B" and the processing device 142 reads the background image A' and the writing image A" stored in the storage module 16 and superimposes the writing image A' and the received writing image B" with the background image A' to form the second synthesized image like the displayed image B illustrated in FIG. 2E. The writing image B" is also stored in the storage module 16 and the second synthesized image is broadcasted to the electronic devices 2, 3a, 3b.

Next, likewise, when the communication module 12 receives the writing image C" again, the writing image C" and the writing image A", B" stored in the storage module 16 are superimposed with the background image A' to form a third synthesized image like the displayed image C illustrated in FIG. 2G, and the aforementioned storing and broadcasting process are executed. Therefore, practically the first electronic device 2 and second electronic devices 3a, 3b sequentially receive the corresponding first, second, third synthesized images like the images A, B, C illustrated in FIG. 2C, 2E, 2G. In other words, when any participant including the speaker inputs the writing image through the electronic device, the VC device 1 generates a corresponding synthesized image according to the currently received writing image or writing image received in the past, and broadcasts the synthesized image to the electronic devices 2, 3a, 3b.

In another embodiment, the storage module 16 is also available for storing the synthesized image. As said before, the processing device 14 sequentially generates the first, second, third synthesized image, and the first, second, third synthesized image are corresponding to the displayed image A, B, C illustrated in FIG. 2C, 2E, 2G respectively. Currently, the VC device 1 sequentially stores the first, second, third synthesized images in the storage module 16 instead of storing the writing images A", B", C" in the previous embodiment. Specifically, the processing module 14 superimposes the writing image A" with the background image A' to generate the first synthesized image. The first synthesized image is not only broadcasted to the electronic devices 2, 3a, and 3b by the communication module 12, but also stored in the storage module 16. When the communication module 12 receives the writing image B" again, the processing module 14 reads the first synthesized image from the storage module 16 and superimposes the writing image B" with the first synthesized image to form the second synthesized image. Next, the broadcasting and storing process are executed. After the writing image C" is received, the writing image C" is superimposed with the second synthesized image to form a third synthesized image and the broadcasting and storing process are executed.

In an embodiment of the present disclosure, the VC device 1 uniformly superimposes the writing image with the background image to form the corresponding synthesized images and broadcasts the synthesized images to the electronic device 2, 3a, 3b. In fact, the number and the type of the image stored in the storage module 16 depend on the functions that the system needs and the communication protocol implementation between the VC device 1 and the electronic device 2, 3a, 3b. Persons skilled in the art can design according to the bandwidth, connection, quality, or other practical concerns. The embodiment is for illustrating but not for limiting the present disclosure.

Figure 4:
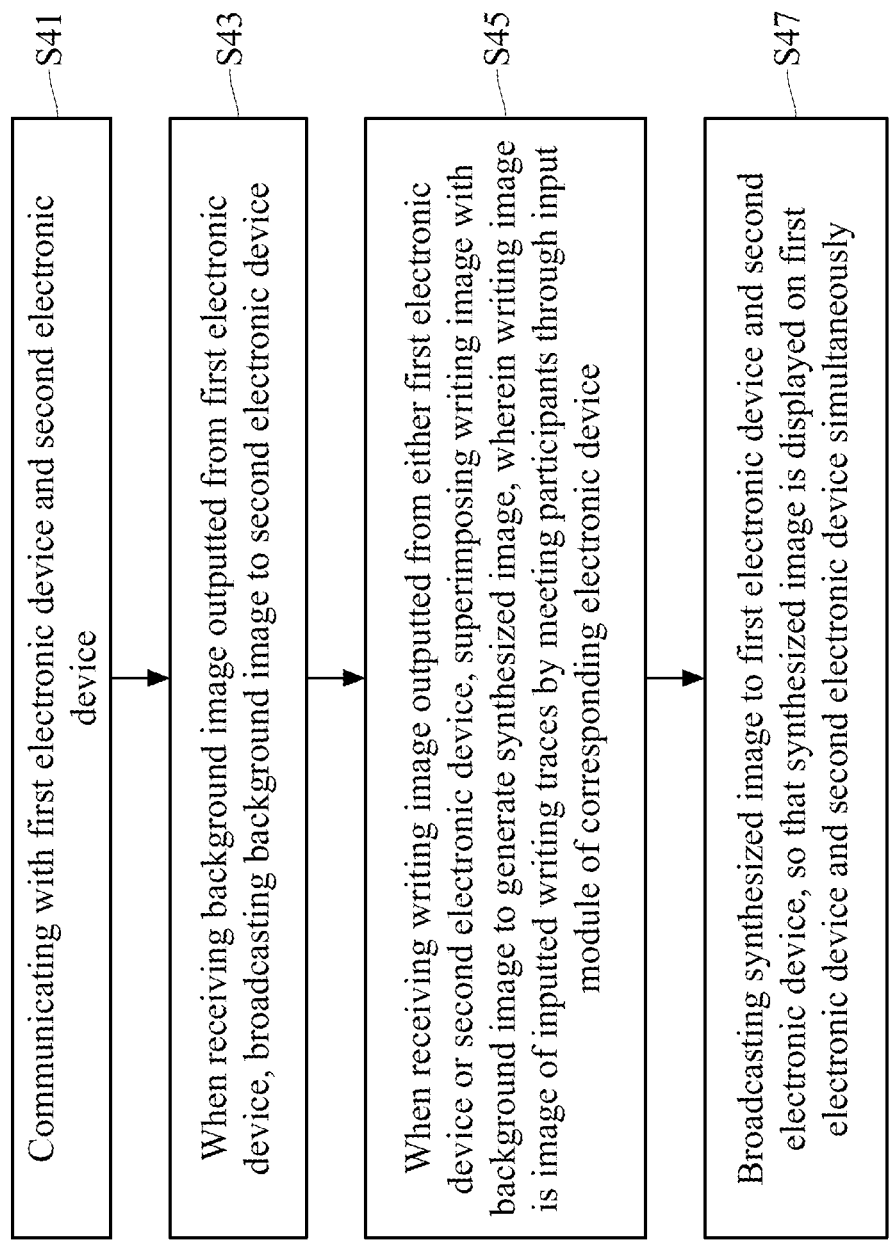
FIG. 4 is a flowchart of the VC device control method according to an embodiment of the present disclosure.

A control method for the VC device is derived from the present disclosure and the control method for the VC device is for a VC system comprising a VC device, a first electronic device, and a second electronic device. Please refer to FIG. 4. FIG. 4 is a flowchart of the VC device control method according to an embodiment of the present disclosure. As shown in FIG. 4, the VC control method includes the following steps. In the step S41, the first electronic device is communicating with the second electronic device. In the step S43, the background image is broadcasted to the second electronic device when the background image outputted from the first electronic device is received. In the step S45, when the writing image outputted from at least one of the first electronic device and the second electronic device is received, the writing image is superimposed with the background image to generate a synthesized image, wherein the writing image is the image of the inputted writing trace by the meeting participants through the input module corresponding to the electronic device. In the step S47, the synthesized image is broadcasted to the first electronic device and the second electronic device, so that the synthesized image is displayed on the first electronic device and the second electronic device simultaneously.

Figure 5:
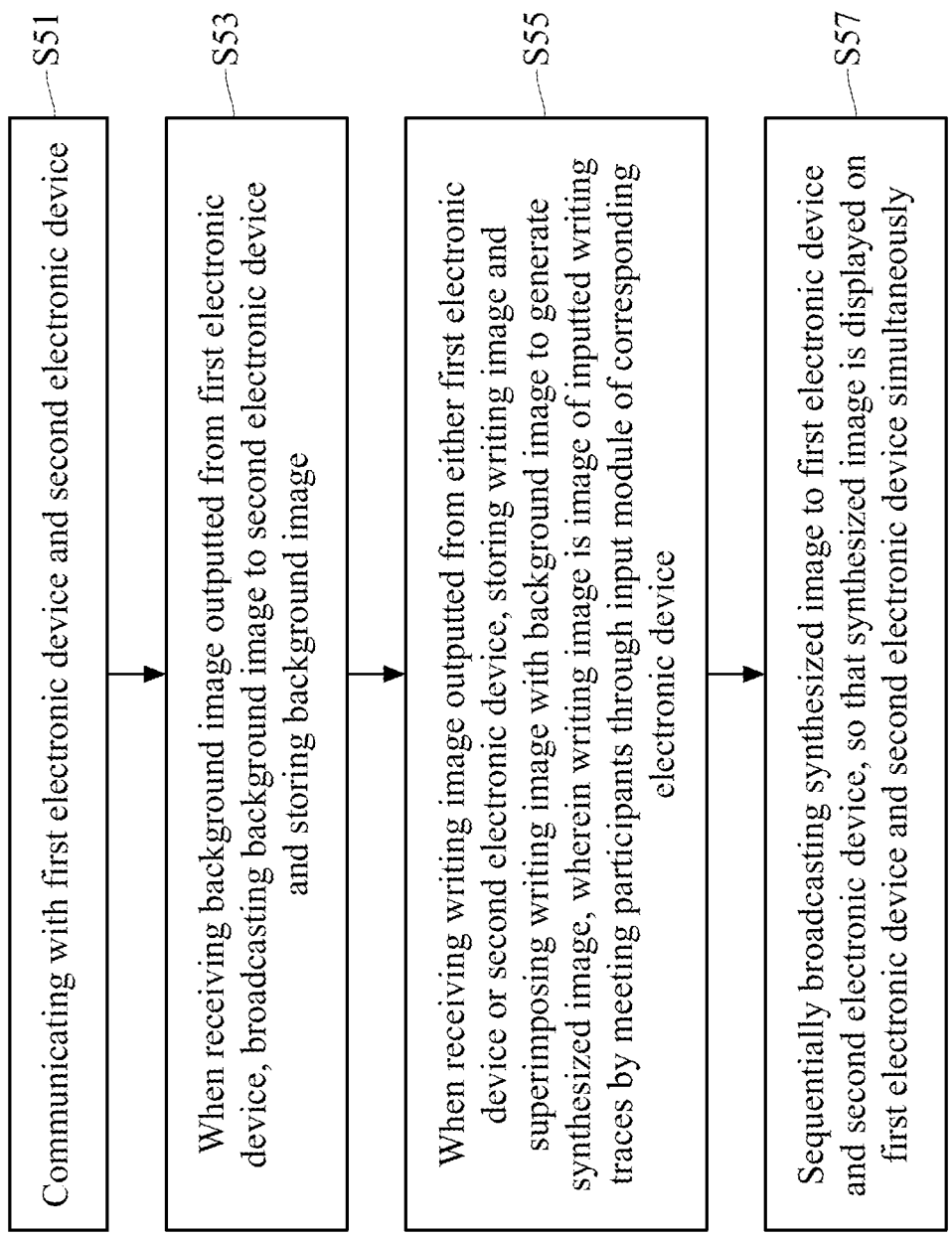
FIG. 5 is a flowchart of the VC device control method according to another embodiment of the present disclosure.

Please refer to FIG. 5. FIG. 5 is a flowchart of the VC device control method according to another embodiment of the present disclosure. As the embodiment shown in FIG. 5, the VC control method further includes the following steps. In the step S53, the background image is stored when the background image is received. In the step S55, the at least one writing image is stored when the at least one writing image is received. In the step S57, the background image is sequentially superimposed with the at least one writing image according to the time of the received at least one writing image to generate the corresponding synthesized image.

The VC system and the control method thereof in an embodiment of the present disclosure receives the background image from the first electronic device and the writing image from the first electronic device or the second electronic device, and the VC device uniformly superimposes the writing image with the background image to generate the synthesized image, and broadcasts the synthesized image to all of the electronic devices used by the participants. The background image is the image related to the presentation contents and the writing image is the trace image related to the marked comments on the presentation contents inputted by the participant with the input devices, so that the synthesized image is related to the presentation contents including the superimposed marks by all of the participants. Therefore, the participants can know the key points on which other participants mark and the supplementary illustrations, and the participants can understand the presentation more clearly through the VC device. In addition, only one VC device is needed to accomplish the task of superimposing the traces and broadcasting, and each end user does not need to own a VC device, so that the cost of the VC is reduced and the practicability is achieved.

The foregoing description has been presented for purposes of illustration. It is not exhaustive and does not limit the disclosure to the precise forms or embodiments disclosed. Modifications and adaptations will be apparent to those skilled in the art from consideration of the specification and practice of the disclosed embodiments of the disclosure. It is intended, therefore, that the specification and examples be considered as exemplary only, with a true scope and spirit of the disclosure being indicated by the following claims and their full scope of equivalents.

What is claimed is:

1. A video conferencing (VC) device for a VC system comprising a first electronic device and a second electronic device, wherein the first electronic device and the second electronic device both has an input module, the VC device comprising:
   a communication module for communicating with the first electronic device and the second electronic device, and when receiving a background image outputted from the first electronic device, broadcasting the background image to the second electronic device, and receiving at least one writing image outputted from either the first electronic device or the second electronic device, wherein the at least one writing image is the image of inputted writing traces by meeting participants through the input module of the corresponding electronic device; and
   a processing module electrically connected to the communication module, when the communication module receives the at least one writing image, for superimposing the at least one writing image with the background image to generate a synthesized image;
   wherein when the processing module generates the synthesized image, the communication module broadcasts the synthesized image to the first electronic device and the second electronic device, so that the synthesized image is displayed on the first electronic device and the second electronic device simultaneously;
   wherein the synthesized image is taken as the background image after being generated by the processing module.

2. The device of claim 1, wherein the input module is selected from the group consisting of a touch panel, a graphics tablets, a mouse, and a keyboard.

3. The device of claim 1, wherein the communication module broadcasts the background image and the synthesized image through a protocol selected from the group consisting of H.239, H.323, session initiation protocol, and Binary Floor Control Protocol (BFCP) protocol.

4. The device of claim 1, wherein the VC device further comprises a storage module electrically connected to the communication module and the processing module, and the storage module is for storing the background image and all of the writing images received by the communication module and for the processing module to sequentially superimpose the background image with the writing image according to the time of the writing image received by the communication module to generate the corresponding synthesized image.

5. The device of claim 1, further comprising a video graphic array (VGA) interface for communicating with the first electronic device and receiving the background image and the writing image.

6. A video conferencing (VC) device control method for a VC system comprising a VC device, a first electronic device and a second electronic device, the VC device control method comprising:
   communicating with the first electronic device and the second electronic device;
   when receiving a background image outputted from the first electronic device, broadcasting the background image to the second electronic device;
   when receiving at least one writing image outputted from either the first electronic device or the second electronic device, superimposing the at least one writing image with the background image to generate a synthesized image, wherein the at least one writing image is the image of inputted writing traces by meeting participants through the input module of the corresponding electronic device;
   broadcasting the synthesized image to the first electronic device and the second electronic device, so that the synthesized image is displayed on the first electronic device and the second electronic device simultaneously; and
   after the synthesized image is generated, taking the synthesized image as the background image.

7. The method of claim 6, wherein the at least one writing image is generated by an input module selected from the group consisting of a touch panel, a graphics tablets, a mouse, and a keyboard.

8. The method of claim 6, wherein the background image and the synthesized image are broadcasted through a protocol selected from the group consisting of H.239, H.323, session initiation protocol, and BFCP protocol.

9. The method of claim 6, further comprising:
   storing the background image when receiving the background image;
   storing the at least one writing image when receiving the at least one writing image; and
   sequentially superimposing the background image with the at least one writing image according to the time of the received at least one writing image to generate the corresponding synthesized image.

10. The method of claim 6, further comprising using a VGA interface to communicate with the first electronic device for receiving the background image and the writing image.

* * * * *